Figure 1:
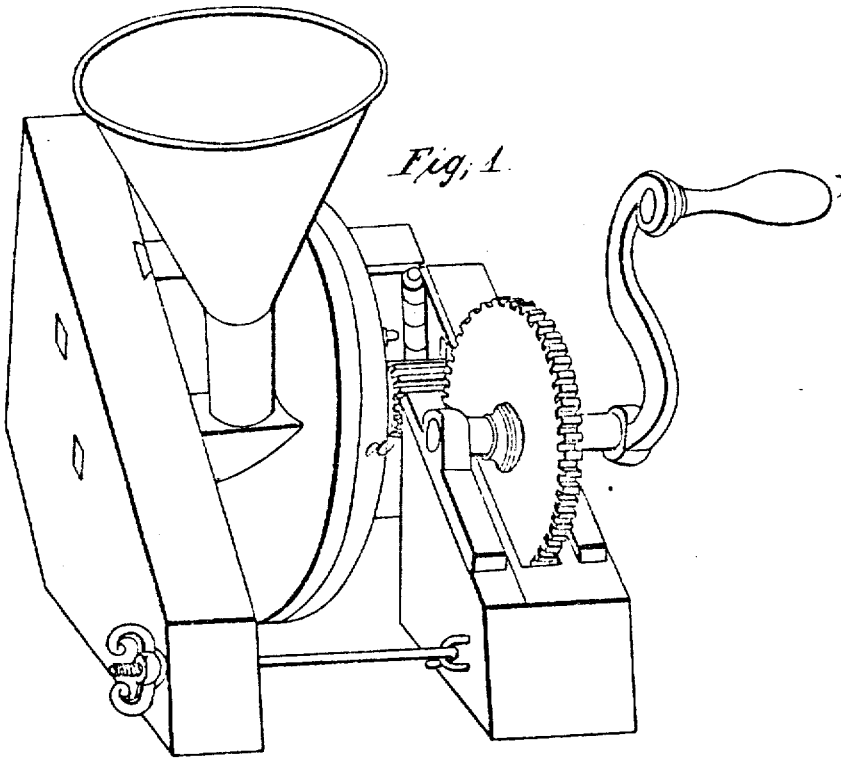
Figure 2:
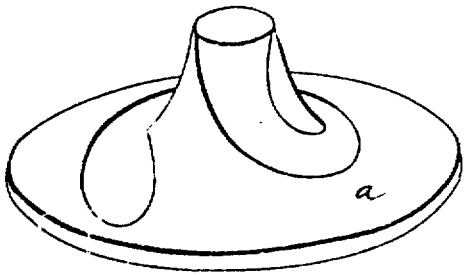

517. XR X 5,381 SR

~~5381x~~ S. Cook.

Paint Mill.

Patented Mar. 3, 1829.

X0005381 ... March 3, 1829

Letters Patent.

The Schedule referred to in these Letters Patent and making part of the same, containing a description in the words of the said Samuel Cook, of his improvement being a Machine for grinding paints, called the Trumpet mouth Paint Mill To all persons to whom these presents shall come; Samuel Cook of Mendon in the County of Worcester, and State of Massachusetts, sends greeting; Know ye that I the said Samuel Cook, have invented constructed, made and applied to use a new and useful improvement in a Machine for grinding paints, called the Trumpet mouth Paint Mill described and specified in the words following, namely.

A piece of cast iron is made in the form of the bell of a trumpet or French horn; and is about half an inch thick, and six inches in diameter at its outer edge or greater diameter, and one inch at its least diameter on the inside, and from the centre of the plane of its greatest diameter to the centre of the plane of its least diameter, on the inside, is about two inches deep. the size and proportions of this piece of iron may be varied, but the resemblance to the bell of a trumpet or French horn must be preserved. At the part of this piece of iron where, were it the bell of a trumpet or French horn, the tubal part would terminate, and the bell commence, which part is here called the bottom of the mill, it is fastened to the frame by a strong bolt, and at this place, and occupying a part of the side piece of iron, is a round hole drilled through an enlargement cast with said piece of iron, for the insertion of a funnel or hopper, through which the paint is received into the mill. The inner surface of said piece of iron is made smooth and even. Another piece of cast iron of a similar shape and thickness, though one quarter of an inch less at its greater diameter, is inserted into that in first above described, so that the inserted surface, which is made smooth and even, exactly fits and touches, as near as possible, in all points m Pat Folio points except the bottom, and where the grooves are cut, the inner
surface of the piece of iron first described. The first described
piece of iron is here called the outer plate, and the second, the
inner plate. In the inserted smooth surface of the inner plate,
two twisting groves are cut about an inch wide, a quarter of an inch
deep, and extending from that part nearest the bottom of the Mill
to within half an inch of the edge of said inner plate. The inner
plate being inserted into the outer plate, the end of a short iron
shaft is inserted into a step in the centre of the outside of said inner
plate, which by pressing against it keeps it in its place, and by a
short shoulder or prong extending from said shaft to another step at
a little distance from the centre of said inner plate, causes said
inner plate to turn with the shaft. The shaft may be turned by a
crank and the motion may be increased by ordinary gearing. The frame is of
plank making three sides of a square. That side to which the shaft is secured is
fastened to another by strong hinges so that by moving this side of the frame
back & forth, the shaft will press more or lefs on the outer plate according to
the desired fineneſs of the paint, ink, or other substance to be ground, or
so that the inner plate may be taken from the outer, and both be cleaned
at pleasure. The shaft is made to press on the inner plate by a ſmall
iron bar fastened to and extending from that side of the frame to
which the shaft is secured, and passing through the opposite side
of the frame with a thumb nut at its end. The frame is fastened
to any perpendicular post, so that the plane of the greatest diameter
of the plates, and the neck of the funnel shall be perpendicular,
and the paint being placed into the funnel passes into the bottom of
the Mill, and into the grooves in the inner plate and is ground
between the surfaces of the plates, and is scraped off at the
lowest point of the edges of the plates, as it passes from between
them, by a small steel scraper which is fastened to the frame
at one end, and presses against them. The peculiar excellence
of this Machine and the object of the exclusive claim are in the
shape of the plates, by which the friction, so far as it respects the
effect effect on the Mill, were then nearly the same at the left as at the greater diameter.

In testimony whereof I, the said Cook have hereunto set my hand and seal on this 14 day of February, in the year of our Lord one thousand eight hundred and twenty nine.

Witnesses
Samuel A. Gripo
Thomas F. Carpenter

Samuel Cook (Seal.)

(Patented March 3. 1829.)